(12) United States Patent
Nardozzi

(10) Patent No.: US 6,601,760 B1
(45) Date of Patent: Aug. 5, 2003

(54) SYSTEM AND METHOD FOR DELIVERING PHOTOGRAPHIC-BASED PRODUCTS TO A CUSTOMER

(75) Inventor: Frank M. Nardozzi, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/064,097

(22) Filed: Jun. 11, 2002

(51) Int. Cl.⁷ .............................................. G06F 17/00
(52) U.S. Cl. ....................................... 235/375; 235/376
(58) Field of Search .................................. 235/375, 376

(56) References Cited

U.S. PATENT DOCUMENTS

| | | | |
|---|---|---|---|
| 4,028,537 A | | 6/1977 | Snow |
| 4,419,573 A | | 12/1983 | Von Geldern |
| 4,550,246 A | * | 10/1985 | Markman .................. 235/385 |
| 4,720,785 A | * | 1/1988 | Shapiro ..................... 235/384 |
| 4,803,348 A | * | 2/1989 | Lohrey et al. ............. 235/381 |
| 4,859,839 A | * | 8/1989 | Tetelman et al. .......... 235/385 |
| 5,032,707 A | * | 7/1991 | Gudmundson et al. .... 235/375 |
| 5,119,126 A | | 6/1992 | Tokuda |
| 5,525,459 A | | 6/1996 | Peterson |
| D375,520 S | | 11/1996 | Koch et al. |
| 5,649,260 A | | 7/1997 | Wheeler et al. |
| 5,652,936 A | | 7/1997 | Klees et al. |
| 6,055,037 A | | 4/2000 | Miyawaki |

* cited by examiner

Primary Examiner—Harold I. Pitts
(74) Attorney, Agent, or Firm—David A. Novais

(57) ABSTRACT

An automated photofinishing system and method for delivering photographic-based products such as prints to a customer includes a minilab that is adapted to receive instructions describing a customer order and specifically, the type and quantity of photographic-based products desired by the customer. The minilab further includes a UPC interface for printing UPC labels having UPC codes thereon that correspond to the type and quantity of the product produced. The UPC codes can correspond to multiple products produced in the same order or a single product having multiple quantity. The UPC code provides a link to a retailer's point-of-sale system.

15 Claims, 2 Drawing Sheets

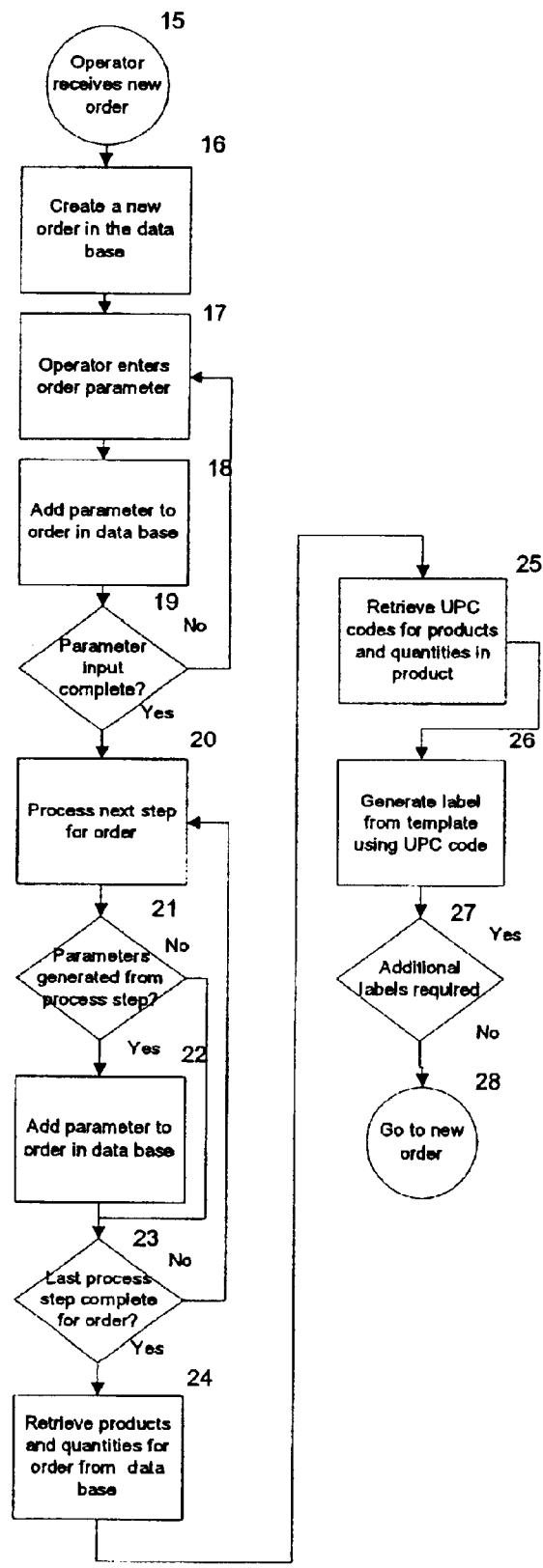
Fig. 2a
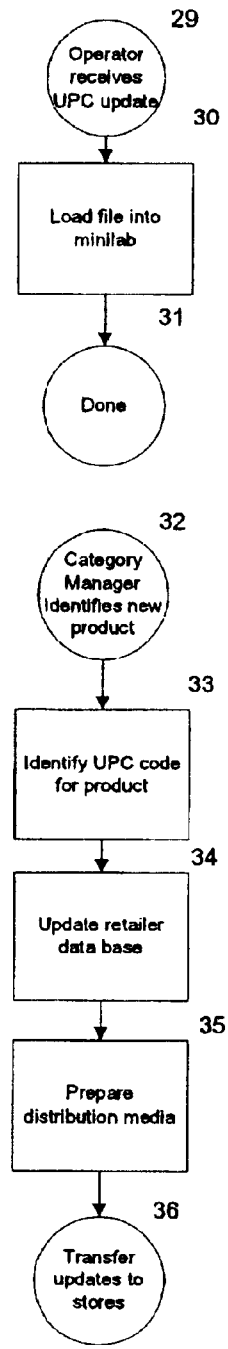
Fig. 2c
Fig. 2b

SYSTEM AND METHOD FOR DELIVERING PHOTOGRAPHIC-BASED PRODUCTS TO A CUSTOMER

BACKGROUND OF THE INVENTION

The use of photofinishing minilabs in retail currently requires that an operator manually mark customer order forms with the number of, for example, prints produced. For each order, the type of products and quantities of each are then manually entered into a cash register or point of sale terminal at a checkout location of a store. Occasionally, stores create notebooks with pages of UPC labels that are scanned at a checkout to reduce the time and data entry errors.

The conventional approach of manually entering the types of products and quantities of each product produced at each cash register or point-of-sale terminal is cumbersome especially when there is a single product with multiple quantity or multiple products with a variable quantity of one of the products.

Conventionally it is known to use bar code information with photofinishing and other retail operations. However, conventional systems do not provide for photofinishing minilabs in which bar code information is linked to a (POS) point-of-sale system for a retail store. That is, conventional photofinishing minilab systems do not provide for a computer interface to a retailer's point-of-sale system.

In a conventional minilab and retail outlet arrangement an operator proceeds as follows: (a) when the minilab has completed the order, the operator writes the number of images that were printed on the order form; (b) when the prints, KODAK Picture CDs or other products that were manufactured for the order are complete, the operator assembles the order placing the products, processed negatives, and the order form together for consumer pickup; and (c) when the consumer picks up the order, the retail clerk enters the product code and print count into the point of sale terminal. Occasionally, retail stores will create notebooks of UPC labels to be scanned rather than hand enter the code. As described above, such an operation is cumbersome especially where there is one product with variable quantities (for example, multiple prints) or multiple products, one of which has a variable quantity (for example, one KODAK Picture CD with multiple prints).

Kodak's wholesale service division, Qualex, utilizes UPC labels for their operations. In this implementation, a sales team and a retailer's category manager work out pricing including sales promotions for several months. The automated wholesale lab keeps track of the work products as they are manufactured in the lab. At the output sorting step, the retail store and the work products are used to determine the product code and price for those products, in that store at that time. The appropriate UPC label is then generated after the product is completed.

SUMMARY OF INVENTION

The present invention relates to a system and method for delivering photographic-based products to a customer which utilizes UPC (Uniform Pricing Code) labels created in a minilab to interface with a retail point-of-sale system of a retail location.

The present invention provides a method and system that is adapted to automatically generate UPC labels in a minilab. In the present invention, the minilab produces a UPC label with the product and quantity without the specific price. The pricing is maintained through normal processes used by a retailer for their POS systems and for their product line. Conventionally, maintaining the price information in distributed minilabs has been a burden that has prevented previous integration into a POS system. Utilizing UPC labels, as described in the present invention, that only identify the products (not price) enables timely control of pricing by retailers in the manner that they manage their product line.

The present invention therefore relates to a system and method of delivering a variety of photographic-based products to a customer which along with creating the photographic-based products, provides for the automatic creation of a UPC code and label that is associated with the photographic-based product.

Since current photofinishing minilabs are automated with software that is fully aware of the products that are being manufactured on the minilab for the customer order, within the context of the present invention, the minilab is adapted to create a UPC code and label that describes the order to a point-of-sales system at a retailer's checkout terminal. In the present invention, the minilab uses software (such as a database within the minilab) to identify the UPC code for the type of products that are being manufactured for the customer's order and the quantity of the product being manufactured. The system and method of the present invention eliminates the need to manually mark customer order forms with, for example, the number of prints produced, and further eliminates the need to manually enter type and quantity of products produced at a point-of-sale terminal.

The present invention therefore provides for a method of handling an order for photographic-based products which comprises the steps of: receiving an order for photographic-based products from a customer; processing the order to begin producing the photographic-based products; automatically creating a UPC code for the photographic-based products to be produced for the order during the processing step, with the UPC code representing a type of photographic-based product being produced; and linking the UPC code with a stored database of pricing information to identify a price for the type of photographic-based products represented by the UPC code.

The present invention further relates to a method of delivering a variety of photographic-based products to a customer which comprises the steps of receiving an order for photographic-based products from a customer; processing the order to begin producing the photographic-based products, wherein a type and a quantity of each of the photographic-based products which are to be produced are determined during the processing step; creating a UPC code for the photographic-based products to be produced for the order during the processing step, with the UPC code representing at least one of an order having a variable quantity of the photographic-based products or an order having multiple distinct photographic-based products in which one of the multiple distinct photographic-based products has a variable quantity; associating each UPC code with a corresponding produced photographic-based product at a point of sale terminal; linking the UPC code with a store database of pricing information to identify a price for the type and quantity of the corresponding photographic-based product represented by the UPC codes; and delivering the produced photographic-based products to the customer.

The present invention further relates to a system for producing and delivering a variety of photographic-based products to a customer which comprises a minilab processing arrangement adapted to process a customer order and produce photographic-based products based on the customer order, with the minilab processing arrangement comprising an interface section which is adapted to determine a type and a quantity of each of the photographic-based products which are to be produced and create a UPC code representative of the type and quantity of the photographic-based products to be produced, and a printing section adapted to print a label with the UPC code thereon. The UPC code represents at least one of an order having a variable quantity of the photographic-based products or an order having multiple distinct photographic-based products in which one of the multiple distinct photographic-based products has a variable quantity.

BRIEF DESCRIPTION OF DRAWINGS

FIGS. 2a–2c illustrates a workflow for creating a UPC label in accordance with the present invention.

DETAILED DESCRIPTION

Figure 1:
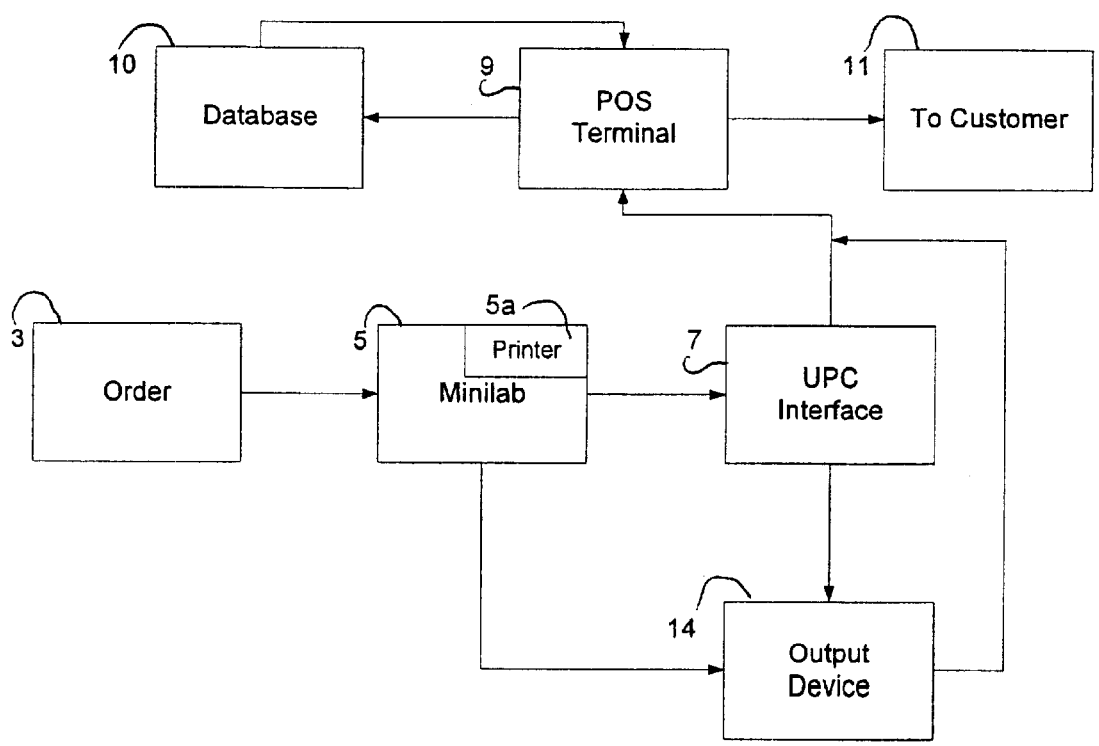
FIG. 1 is a schematic view of the system and method of the present invention detailing the workflow with respect to a minilab.

Referring now to FIG. 1, which schematically illustrates a retail store or outlet, in the system and method of the present invention, a consumer provides an order 3 to a retail store which includes, for example, a minilab 5. As an example, order 3 could comprise film which the consumer brings to the retail outlet. At a retail counter or at a conveniently located drop-off station, the consumer fills out a photofinishing order form describing the photographic-based products that they would like to purchase based on the images provided on the film in order 3. The photofinishing order form may be printed on an envelope used to hold the film as the order is presented to the retail clerk at the retail counter.

At some subsequent time, the retail clerk takes the order and processes the film if necessary. This may include placing a twin check on the roll of film and on the order form.

When the retailer is ready to process the order, a minilab operator takes the order form and enters the appropriate information at the order entry terminal of minilab 5. The operator then scans the film, scans prints, loads electronic media into minilab 5 or downloads an electronic file depending on the format of the image source from the consumer and the content of order 3. Thus, the system and method of the present invention is applicable to a variety of image sources and photographic-based products, such as prints from electronic cameras, KODAK Picture CDs, electronic storage such as an America Online account and other sources.

Minilab 5 processes the order in a known manner as specified by the operator. As part of the processing, minilab 5 determines which of the images are saleable. Commonly prints are produced only for those images that a typical consumer is willing to pay for. Images that are blurred, poorly exposed or have other objectionable characteristics may not be printed and thus, the consumer may not have to pay for these poor quality images.

Since current photofinishing minilabs are automated with software that is fully aware of the products that are being manufactured on that minilab for the specific customer order, the present invention provides for a UPC interface 7 which is adapted to create a UPC code based on the photographic product being produced, and a label printer 5a associated with minilab 5. The UPC code can represent specifics of a customer order such as, for example, an order having a variable quantity of photographic based products such as multiple prints, or an order having multiple distinct photographic-based products wherein one of the multiple distinct photographic based products has a variable quantity, such as a single CD with multiple prints. Printer 5a could be a self-adhesive label printer which is adapted to affix a label having the UPC code thereon onto the photographic-based product. UPC interface 7 can be integrated with minilab 5, or can be set up as a separate system. Associated with UPC interface 7 is an output device 14 such as a separate printer, or a printer integrated with minilab 5. For example, output device 14 can be a printer which prints photographic prints in accordance with the customer order.

With the system and method of the present invention, when the customer order is being processed or is about half-way through completion, it is known what images of the order will be saleable and provided to the customer. At this point, UPC interface 7 creates a UPC code that describes the order to the point-of-sale system at the retailer's check-out terminal, and printer 5a is adapted to print a label which includes the UPC code. Within the context of the present invention, minilab 5 can include software or a database within the minilab to identify the UPC code with the type of products that are being manufactured for the customer's orders, and the quantity of the products being manufactured. Depending on the preference of the retail store, one or multiple UPC labels could be printed for a customer order depending on the number of products being ordered by a customer in a single order.

The software of minilab 5 may have an Application Programmers Interface which works through UPC interface 7 and allows the retailer to select the UPC code, descriptive name and other parameters for a product. This may be in a form that allows the retailer to store file(s) on electric media for distribution to its retail outlets and installation on the minilabs. An alternative is to utilize a modem, Ethernet or communication link to update the individual stores. As a still further alternate, minilab 5 can have a separate software application that allows the retailer to select the UPC code, descriptive name, and other parameters for a product. This may be an integrated part of the minilab software, a separate application that runs on the computer of the minilab or a separate application that runs on a separate computer.

Therefore, based on the customer's order, a label having a UPC code specific to the quantity and type of photographic-based products is printed by printer 5a, and the photographic-based products, also in accordance with the customer order, are provided by output device 14 (for example, photographic prints provided by a printer, CD's by a CD burner, etc).

When the photographic-based products, such as prints, picture CDs and other products that are manufactured for an order are complete, an operator assembles the order placing the products, processed negatives and the order form together for consumer pickup. Within the context of the present invention, the photographic-based products can include, but are not limited to, photographic prints, print enlargements, photo or picture CD's, a mug having an image thereon, an article of clothing having an image thereon, etc.

When the consumer picks up the order, a retail clerk enters the UPC code and print count into a point of sale terminal 9 by, for example, scanning the UPC label having the UPC code thereon. Depending on the preference of the retail store, one or more UPC labels are printed for the customer's order depending on the number of products being ordered by a customer in a single order.

Therefore, at point-of-sale terminal 9, the retail clerk simply has to scan the UPC label which includes a UPC code that has information on the type and quantity of photographic-based products produced. The UPC label enables an automatic link to a database 10 which includes pricing information on the photographic-based products produced by the minilab, and provides a final pricing to the customer. Thereafter, the assembled finished photographic-based products are provided to the customer 11.

Accordingly, with the system of the present invention, an order is received and processed. During the processing of the order in minilab 5, a UPC code for the photographic-based products in the order is created. The UPC code can represent an order having a variable quantity of photographic-based products such as multiple prints, or an order having multiple distinct photographic-based products wherein one of the multiple distinct photographic based products has a variable quantity, such as a single CD with multiple prints. At point-of-sale terminal 9, the UPC code is associated with the produced photographic-based product and linked with the stored database of pricing information 10 to identify a price for the type and quantity of the corresponding photographic-based products represented by the UPC code.

A preferred use of the system and method of the invention is at a minilab of a retail location, with the stored database of pricing information being part of a point-of-sale system for the retail location.

The system and method of the present invention provides an automated arrangement for completing a photofinishing order and automatically creating UPC codes based on the products in the order which provide a link to a stored database of pricing information. Minilab 5 including UPC interface 7 can make up part of a work station which includes a means to interact with an operator to receive instructions that describes the product desired by the consumer. Printer 5a can print a label with a UPC code corresponding to the type and quantity of the product produced. The UPC label can correspond to multiple products produced in the same order, and can be a self-adhesive label. The software within minilab 5 for producing a UPC label can reside in the minilab itself and can be adapted to describe the specific UPC code that corresponds to each product. As a further option, the software can reside on a separate computer to describe the specific UPC code that corresponds to each product. Further, the UPC code may be established by the manager of the store.

FIG. 2a illustrates a logical workflow which details the creation of a UPC label in accordance with the present invention. As shown in FIG. 2a, in the system and method of the present invention, an operator receives a new order ready for processing in minilab 5 (step 15). The new order is identified through a user interface and an entry for the new order is created in a database within minilab 5 (step 16). The operator is then prompted for a series of parameters (step 17) describing the products that are desired for the order. These parameters are added to the database (step 18) with a reference to the order. Additional parameters are then entered (step 19) until the order is fully described.

When the order is described (answer yes to step 19), the minilab executes a series of process steps necessary to complete the order (step 20). Examples of process steps are identification of frames on a strip of film, determination of density and color adjustments, sizing the image for the print size, etc. When there is a desire to save a parameter (step 21), the parameter is added to the database (step 22) referencing the order and other parameters from step 18 as desired. Steps 20 through 23 are repeated until all of the products are manufactured.

When the last process step is completed, the product identification and quantities are retrieved from the database (step 24). It is recognized that the same product and quantity can be requested for each image within an order as is customary with double or single print offers at retail. It also recognized that multiple sizes and quantities for selected images can be requested as is customary for reprints.

The database entries described with reference to FIG. 2a are processed to identify the quantities of each product manufactured. The appropriate UPC code is then retrieved (step 25) from the database when a single UPC code describes the products. Multiple UPC codes are retrieved when multiple UPC codes are preferred by the retailer. One or more labels are printed based on the number of UPC codes and the preference of the retailer (steps 26 and 27). The minilab then continues to process additional orders (step 28).

FIG. 2b illustrates a workflow where a retail category manager identifies a new product (step 32) to be manufactured by the minilab. In this case, the retail manager identifies the UPC code (step 33) that will be used in their POS system and the minilab. The retailer manager further updates their POS database (step 33) and generates a distribution file (step 35). The distribution file can be transferred (step 36) to minilabs through a CDROM, electronic download PC, Tivoli, etc. or other distribution media of choice.

FIG. 2c illustrates a workflow when an operator receives a UPC update at the retail store (step 29). In this case, the operator loads the update (step 30) when provided with electronic media (i.e. CDROM) and the process is completed (step 31). When the UPC update is provided through a remote service (i.e. Tivoli), the minilab update is managed by the remote service.

The invention has been described in detail with particular reference to certain preferred embodiments thereof, but it will be understood that variations and modifications can be effected within the spirit and scope of the invention.

What is claimed is:

1. A method of handling an order for photographic-based products, the method comprising the steps of:

receiving an order for photographic-based products from a customer;

processing said order to begin producing said photographic-based products;

automatically creating a UPC code for the photographic-based products to be produced for said order during said processing step, said UPC code representing a type of photographic-based product being produced; and linking said UPC code with a stored database of pricing information to identify a price for the type of photographic-based products represented by the UPC code.

2. A method according to claim 1, wherein said UPC code is provided on a self-adhesive label which is affixed onto the produced photographic-based product.

3. A method according to claim 1, wherein said photographic-based product is at least one of photographic prints, a photographic print enlargement, a photo CD, a mug having an image thereon, and a clothing article having an image thereon.

4. A method according to claim 1, wherein said photographic-based products are photographic prints.

5. A method according to claim 1, wherein said photographic-based products are produced in a minilab of a retail location and said stored database of pricing information is part of a point of sale system for the retail location.

6. A method of delivering a variety of photographic-based products to a customer, the method comprising the steps of:

receiving an order for photographic-based products from a customer;

processing said order to begin producing said photographic-based products, wherein a type and a quantity of each of the photographic-based products which are to be produced are determined during said processing step;

creating a UPC code for the photographic-based products to be produced for said order during said processing step, said UPC code representing at least one of an order having a variable quantity of the photographic-based products or an order having multiple distinct photographic-based products in which one of the multiple distinct photographic-based products has a variable quantity;

associating each UPC code with a corresponding produced photographic-based product at a point of sale terminal;

linking said UPC code with a stored database of pricing information to identify a price for the type and quantity of the corresponding photographic-based products represented by the UPC code; and delivering said produced photographic-based products to the customer.

7. A method according to claim 6, wherein said UPC code is provided on a self-adhesive label which is affixed onto the produced photographic-based product.

8. A method according to claim 6, wherein said photographic-based product is at least one of photographic prints, a photographic print enlargement, a photo CD, a mug having an image thereon, and a clothing article having an image thereon.

9. A method according to claim 6, wherein said photographic-based products are photographic prints.

10. A method according to claim 6, wherein said photographic-based products are produced in a minilab of a retail location and said stored database of pricing information is part of a point of sale system for the retail location.

11. A system for producing and delivering a variety of photographic-based products to a customer, the system comprising:

a mini-lab processing arrangement adapted to process a customer order and produce photographic-based products based on said customer order, said mini-lab processing arrangement comprising an interface section which is adapted to determine a type and a quantity of each of the photographic-based products which are to be produced and create a UPC code representative of the type and quantity of the photographic-based products to be produced, and a printing section adapted to print a label with the UPC code thereon, said UPC code representing at least one of an order having a variable quantity of the photographic-based products or an order having multiple distinct photographic-based products in which one of the multiple distinct photographic-based products has a variable quantity.

12. A system according to claim 11, further comprising a database that includes prices for each of the photographic-based products, said UPC code being linked to said database to identify a price for the type and the quantity of the photographic-based products represented by the UPC code, said minilab being located at a retail location and said database being part of a point of sale system of said retail location.

13. A system according to claim 11, wherein said UPC code is provided on a self-adhesive label which is affixed onto the produced photographic-based product.

14. A system according to claim 11, wherein said photographic-based product is at least one of photographic prints, a photographic print enlargement, a photo CD, a mug having an image thereon, and a clothing article having an image thereon.

15. A system according to claim 11, wherein said photographic-based products are photographic prints.

* * * * *